US011867358B2

(12) United States Patent
Estebe et al.

(10) Patent No.: US 11,867,358 B2
(45) Date of Patent: Jan. 9, 2024

(54) TANK HAVING ENHANCED INSULATION COMBINING THERMAL INSULATION MATS WITH MICROSPHERES, AND METHOD OF MANUFACTURING SUCH A TANK

(71) Applicant: Airbus Operations SAS, Toulouse (FR)

(72) Inventors: Bruno Estebe, Toulouse (FR); Julien Laverne, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/830,175

(22) Filed: Jun. 1, 2022

(65) Prior Publication Data

US 2022/0390071 A1 Dec. 8, 2022

(30) Foreign Application Priority Data

Jun. 4, 2021 (FR) ...................................... 2105876

(51) Int. Cl.
*F17C 13/00* (2006.01)

(52) U.S. Cl.
CPC .... *F17C 13/001* (2013.01); *F17C 2201/0128* (2013.01); *F17C 2203/0337* (2013.01);
(Continued)

(58) Field of Classification Search
CPC B65D 81/3818; B65D 81/3869; B65D 81/38; F17C 13/001; F17C 2203/0391;
(Continued)

(56) References Cited

U.S. PATENT DOCUMENTS 3,257,265 A * 6/1966 Isenberg ............... F17C 13/001 428/313.9
3,390,703 A * 7/1968 Matlow ................... F16L 59/14 220/62.19

(Continued)

FOREIGN PATENT DOCUMENTS

DE 2750457 A * 6/1978 ............ F16L 59/028
DE 10352568 B4 * 5/2017 ................ F17C 3/04

(Continued)

OTHER PUBLICATIONS

French Search Report for corresponding French Patent Application No. 2105876 dated Feb. 24, 2022; priority document.

*Primary Examiner* — Robert J Hicks
(74) *Attorney, Agent, or Firm* — Greer, Burns & Crain, Ltd.

(57) ABSTRACT

A tank suitable for storing a product at a cryogenic temperature, including a fluid tight interior barrier, a fluid tight exterior barrier, surrounding the first interior barrier, an intermediary volume interposed between the interior and exterior barriers and at least one insulating layer positioned in the intermediary volume and including at least one thermal insulation mat, with very low thermal conductivity. The intermediary volume contains microspheres outside of the thermal insulation mats and has an enhanced level of vacuum. This solution makes it possible to maintain satisfactory performance in terms of thermal insulation even in the event of a loss of vacuum in the intermediary volume.

14 Claims, 4 Drawing Sheets

(52) U.S. Cl.
CPC ................. *F17C 2203/0391* (2013.01); *F17C 2203/0629* (2013.01); *F17C 2203/0685* (2013.01); *F17C 2209/238* (2013.01); *F17C 2221/012* (2013.01); *F17C 2223/013* (2013.01); *F17C 2270/0186* (2013.01)

(58) Field of Classification Search
CPC .......... F17C 2203/03; F17C 2203/0341; F17C 2203/0337; F17C 2203/0304; F17C 2203/0629; F17C 2203/0631; F17C 2203/0626; F17C 2203/0619; F17C 2201/01; F17C 2209/238; F17C 2209/23; F17C 2223/0123; F17C 2223/036; F17C 2221/013; F17C 2221/012; F17C 2221/01; F17C 2201/0128; F17C 2203/0685; F17C 2203/0697; F17C 2270/0186
USPC ............ 220/560.12, 560.04, 592.27, 592.26, 220/592.2, 586, 581, 62.15, 62.18
See application file for complete search history.

(56) References Cited

U.S. PATENT DOCUMENTS

| | | | | | |
|---|---|---|---|---|---|
| 3,410,443 | A * | 11/1968 | Hofmann | ................ | F16L 59/08 220/592.27 |
| 3,607,169 | A * | 9/1971 | Coxe | ....................... | C03C 17/09 264/43 |
| 4,027,379 | A * | 6/1977 | Cheng | ................... | F16L 59/065 220/592.27 |
| 6,858,280 | B2 | 2/2005 | Allen et al. | | |
| 2003/0203149 | A1 | 10/2003 | Allen et al. | | |
| 2005/0005571 | A1 | 1/2005 | Manini et al. | | |
| 2012/0279971 | A1 | 11/2012 | Brooks et al. | | |

FOREIGN PATENT DOCUMENTS

| | | | | | |
|---|---|---|---|---|---|
| EP | 0012038 | A1 | 6/1980 | | |
| EP | 3348893 | A1 | 11/2012 | | |
| FR | 2340289 | A1 * | 9/1977 | ............. | C04B 43/00 |

* cited by examiner

Fig. 8
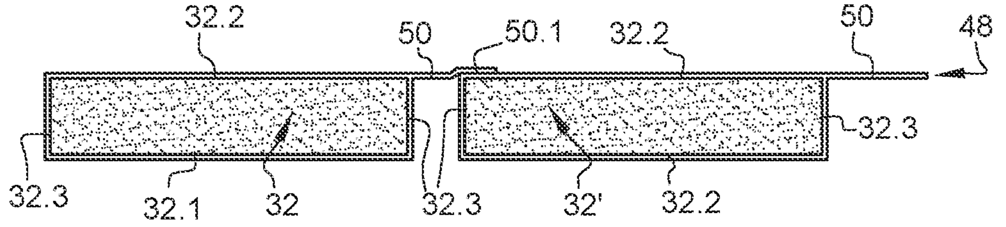
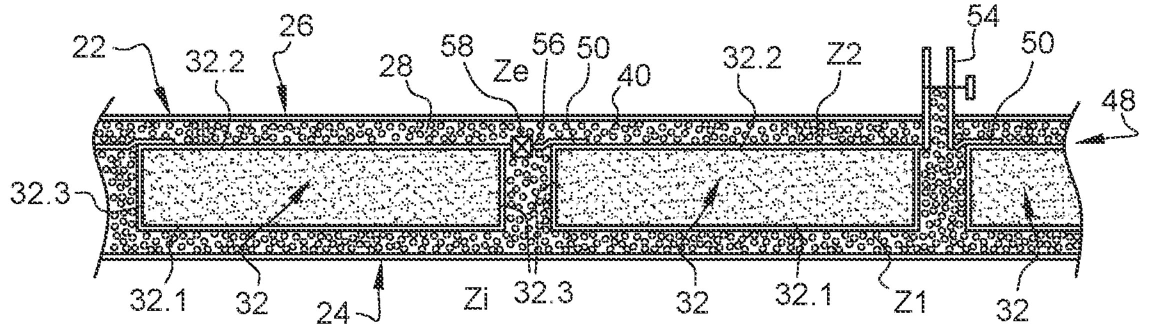
Fig. 9
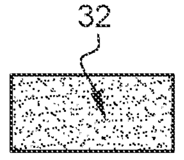
Fig. 10A
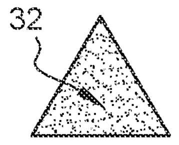
Fig. 10B
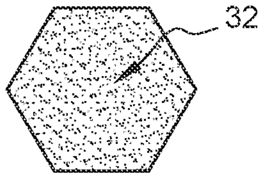
Fig. 10C
Fig. 11
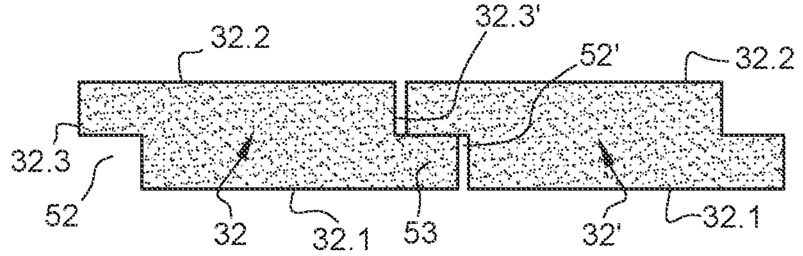
Fig. 12
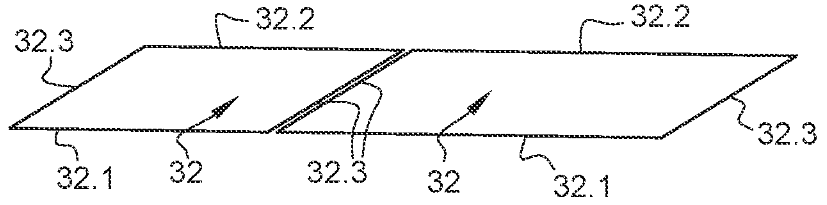

TANK HAVING ENHANCED INSULATION COMBINING THERMAL INSULATION MATS WITH MICROSPHERES, AND METHOD OF MANUFACTURING SUCH A TANK

CROSS-REFERENCES TO RELATED APPLICATIONS

This application claims the benefit of the French patent application No. 2105876 filed on Jun. 4, 2021, the entire disclosures of which are incorporated herein by way of reference.

FIELD OF THE INVENTION

The present application relates to a tank having enhanced insulation combining thermal insulation mats with microspheres, and to a method for manufacturing such a tank.

BACKGROUND OF THE INVENTION

According to one embodiment visible in FIG. 1, a tank 10 configured to store a product at a cryogenic temperature comprises, from the interior Int towards the exterior Ext, an interior barrier 12, a multilayer insulation 14 of the MLI (Multi-Layer Insulation) type and an exterior barrier 16. In one configuration, the interior and exterior barriers 12, 16 are rigid. A vacuum of the order of 10-7 to 10-11 bar is established between the interior and exterior barriers 12 and 16. This configuration makes it possible to achieve excellent performance in terms of thermal insulation. However, this performance is greatly diminished if there is an accidental loss of vacuum between the interior and exterior barriers 12, 16.

According to an embodiment described in document U.S. Pat. No. 6,858,280, a thermal insulation mat comprises a flexible wrapper containing glass microspheres and inside which a vacuum is established. According to one application, this thermal insulation mat can be used to insulate pipes or tanks by being interposed between two barriers.

However, as previously, the performance in terms of thermal insulation is greatly impaired if there is an accidental loss of vacuum in the thermal insulation mats.

The present invention seeks to overcome all or some of the disadvantages of the prior art.

SUMMARY OF THE INVENTION

To this end, one subject of the invention is a tank comprising a wall separating an interior zone and an exterior zone, the wall comprising a fluid tight interior barrier, a fluid tight exterior barrier, an intermediary volume interposed between the interior and exterior barriers and at least one insulating layer positioned in the intermediary volume and comprising at least one thermal insulation mat, said thermal insulation mat comprising a wrapper containing at least a material and having an enhanced level of vacuum.

According to the invention, the intermediary volume contains microspheres outside of the thermal insulation mats and has an enhanced level of vacuum.

This solution makes it possible to maintain satisfactory performance in terms of thermal insulation even in the event of a loss of vacuum in the intermediary volume.

According to another feature, the microspheres are distributed around the thermal insulation mats in such a way as to envelop them.

According to another feature, the wall comprises at least first and second insulating layers each having several thermal insulation mats which are juxtaposed and separated by gaps, the gaps of the first insulating layer being offset with respect to the gaps of the second insulating layer.

According to another feature, of the interior and exterior barriers, at least one is rigid.

According to one embodiment, the interior barrier is rigid and the exterior barrier is made of a flexible material.

According to another embodiment, the exterior barrier is rigid and the interior barrier is made of a flexible material.

According to another feature, the tank comprises at least one rigid connecting system connected to the rigid exterior barrier.

According to another feature, the wrapper of each thermal insulation mat contains microspheres.

According to another feature, the wall comprises a fluid tight intermediate barrier positioned between the interior and exterior barriers and dividing the intermediary volume into a first zone situated between the intermediate barrier and the interior barrier and a second zone situated between the intermediate barrier and the exterior barrier.

According to another feature, the intermediate barrier comprises the thermal insulation mats of the one same insulating layer which are joined together in a fluid tight manner.

According to another feature, at least a first thermal insulation mat comprises at least an extension having a zone of overlap covering a second thermal insulation mat and connected to the latter in a fluid tight manner.

According to another feature, the wall comprises at least one duct opening into the first zone, said duct passing through the second zone and the exterior barrier.

According to another feature, the intermediate barrier comprises at least one orifice configured to provide communication between the first and second zones, said orifice being equipped with a nonreturn valve configured to allow extraction of the gases present in the first zone while preventing any flow of gas from the second zone toward the first zone.

Another subject of the invention is a method for manufacturing a tank according to any one of the preceding features. This method comprises a step of positioning thermal insulation mats against a rigid interior or exterior barrier to form at least one insulating layer, a step of fitting another interior or exterior barrier to delimit an intermediary volume in which the thermal insulation mats are positioned, a step of filling the intermediary volume with microspheres and a step of pulling a vacuum in the intermediary volume.

According to another feature, during the positioning step, the thermal insulation mats are connected to the rigid interior or exterior barrier.

BRIEF DESCRIPTION OF THE DRAWINGS

Further features and advantages will become apparent from the following description of the invention, which description is given purely by way of example with reference to the attached drawings among which:

FIG. 8 is a schematic cross section through two thermal insulation mats illustrating one embodiment of the invention, FIG. 9 is a schematic cross section through a wall of a tank incorporating the thermal insulation mats visible in FIG. 8, FIGS. 10A, 10B and 10C depict views from above of a thermal insulation mat illustrating various embodiments of the invention, FIG. 11 is a schematic cross section through two thermal insulation mats illustrating one embodiment of the invention, and FIG. 12 is a schematic cross section through two thermal insulation mats illustrating one embodiment of the invention.

DETAILED DESCRIPTION OF THE PREFERRED EMBODIMENTS

Figure 1:
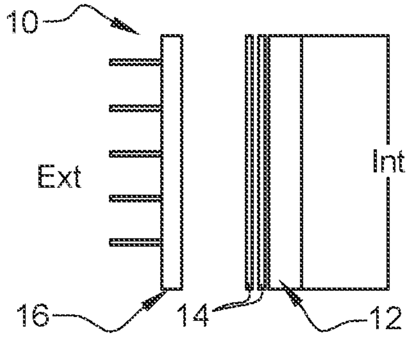
Fig. 1 Prior Art
FIG. 1 is a partial section through a tank illustrating one embodiment of the prior art.
Figure 2:
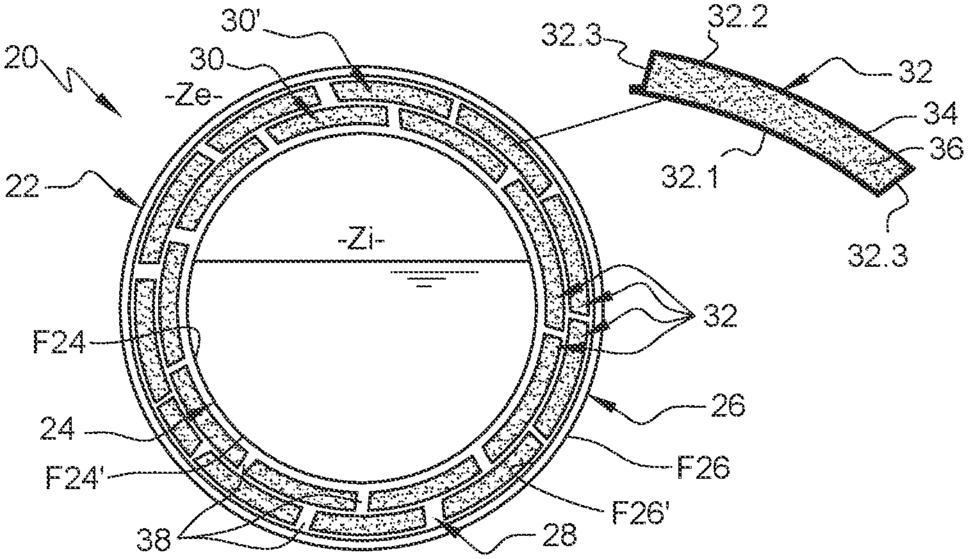
FIG. 2 is a cross section through a tank illustrating a first embodiment of the invention.
Figure 3:
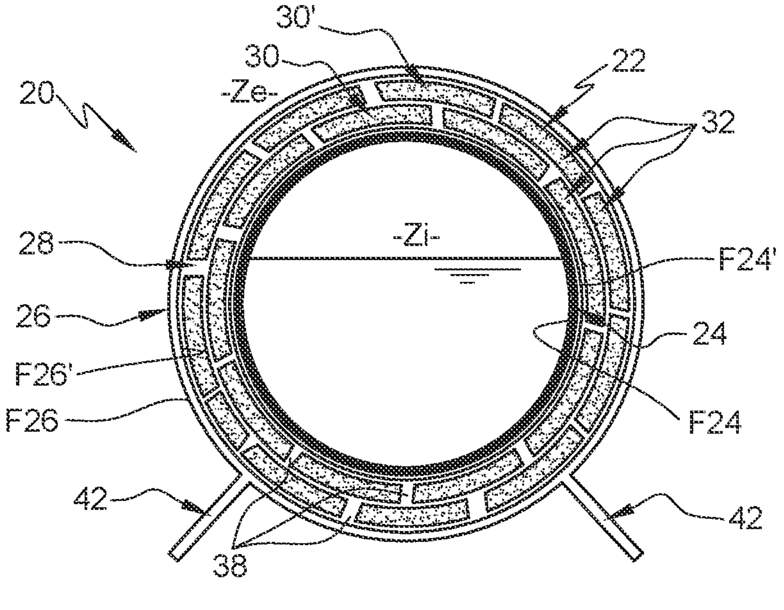
FIG. 3 is a cross section through a tank illustrating a second embodiment of the invention.

In FIGS. 2 and 3, a tank 20 comprises a wall 22 separating an interior zone Zi and an exterior zone Ze.

According to one application, this tank 20 is configured to store a product at a cryogenic temperature, such as liquid hydrogen at a temperature of the order of −250° C., for example. An aircraft operating on hydrogen may comprise at least one such tank 20.

According to one configuration, the tank 20 has a spherical shape.

Of course, the invention is limited neither to this application nor to this shape of the tank 20.

According to one embodiment, the wall 22 comprises a fluid tight interior barrier 24 having a first face F24 facing toward the interior zone Zi and a second face F24' opposite to the first face F24, a fluid tight exterior barrier 26, surrounding the first interior barrier 24 and having a first face F26 oriented toward the exterior zone Ze and a second face F26' opposite to the first face F26, an intermediary volume 28 interposed between the fluid tight interior and exterior barriers 24, 26, and at least one insulating layer 30 positioned in the intermediary volume 28, between the interior and exterior barriers 24, 26.

As illustrated in FIG. 2 for example, each insulating layer 30 comprises at least one thermal insulation mat 32 comprising a wrapper 34 containing first microspheres 36 and having an enhanced level of vacuum.

What is meant by an enhanced level of vacuum is that the atmosphere contained in the wrapper 34 is at a pressure of below 10-2 bar, preferably below 10-3 bar.

What is meant by a microsphere is an element of approximately spherical and hollow shape, with a thin wall and a diameter of less than 1 mm on average, preferably greater than 1 μm on average.

According to one configuration, each insulating layer 30 comprises several juxtaposed thermal insulation mats 32.

Figure 4:
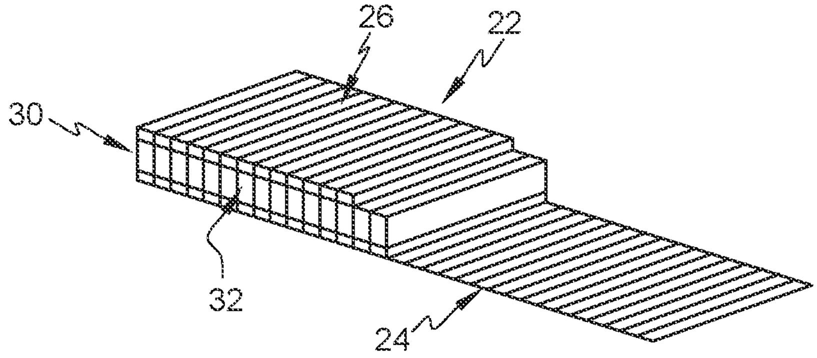
FIG. 4 is a schematic cross section through a wall of a tank illustrating one embodiment of the invention.
Figure 5:
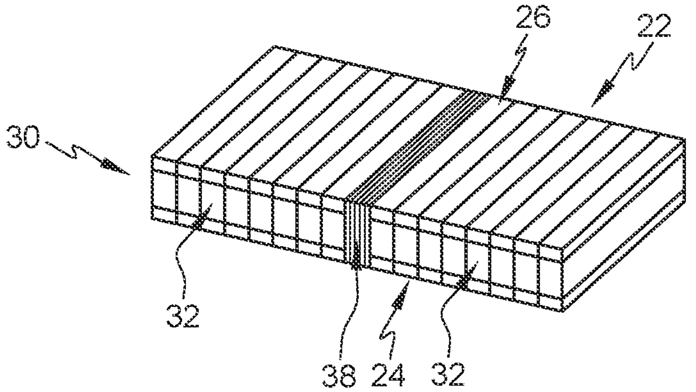
FIG. 5 is a schematic cross section through a wall of a tank illustrating one embodiment of the invention.

According to one embodiment visible in FIGS. 4 and 5, the wall 22 comprises a single insulating layer 30 comprising several juxtaposed thermal insulation mats 32.

Figure 6:
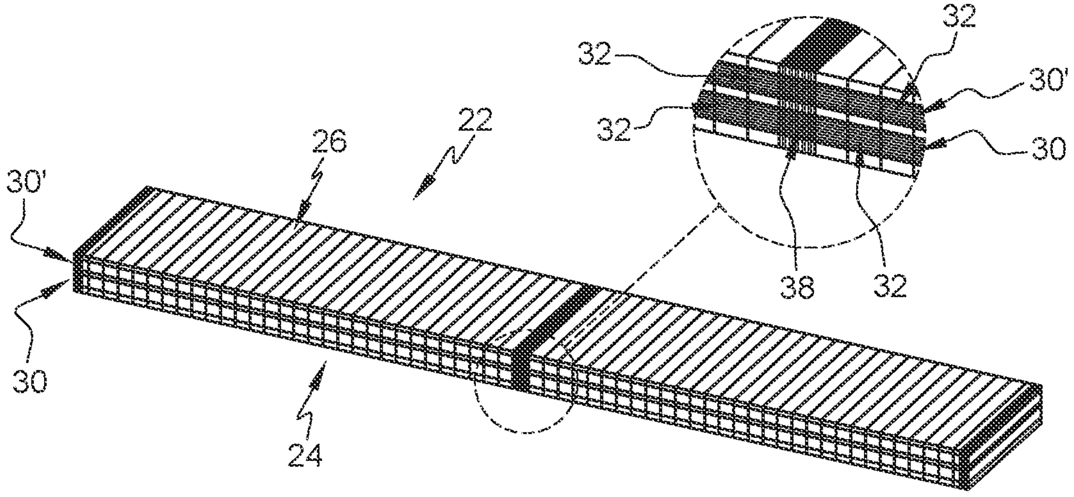
FIG. 6 is a schematic cross section through a wall of a tank illustrating one embodiment of the invention.

According to other embodiments visible in FIGS. 2, 3, 6, the wall 22 comprises several insulating layers 30, 30' superposed on one another and comprising several juxtaposed and superposed thermal insulation mats 32.

According to one embodiment, the wrapper 34 comprises at least a film made of a synthetic material such as a film made of polyethylene (PE), of polyethylene terephthalate (PET) or of polyamide (PA) for example. The wrapper 34 may have a metallic surface coating or film of aluminum alloy, for example.

According to one embodiment, the first microspheres 36 have a diameter comprised between 0.1 and 500 μm. These first microspheres 36 are made from a material of low thermal conductivity. By way of example, the first microspheres 36 are microspheres marketed under the tradename "glass bubbles".

After each wrapper 34 has been filled with the first microspheres 36, the air present in the wrapper 34 is removed in order to obtain an enhanced level of vacuum inside the wrapper 34.

Of course, the invention is not restricted to this embodiment for the thermal insulation mats 32. Thus, the first microspheres 36 could be replaced by any other material exhibiting low thermal conductivity. Thus, the thermal insulation mats 32 may be of the VIP (Vacuum Insulated Panel) type or MIP (Microsphere Insulated Panel) type. Whatever the embodiment, each thermal insulation mat 32 comprises a wrapper 34 containing at least one material and having an enhanced level of vacuum.

Each thermal insulation mat 32 comprises a first face 32.1 oriented toward the interior barrier 24, a second face 32.2 opposite to the first face 32.1 and oriented toward the exterior barrier 26, and at least one edge face 32.3 connecting the first and second faces 32.1, 32.2. According to one configuration, the first and second faces 32.1, 32.2 have an identical contour which may be square or rectangular as illustrated in FIG. 10A, triangular as illustrated in FIG. 10B, hexagonal as illustrated in FIG. 10C. Of course, the invention is not restricted to these shapes for the contour of the first and second faces 32.1, 32.2 of the thermal insulation mats 32. According to one arrangement, the thermal insulation mats 32 of the one same insulating layer 30, 30' all have the same contour, the latter being chosen notably according to the geometry of the insulating layer 30, 30' in order to optimize the overlapping thereof.

According to one embodiment, the edge faces 32.3 of the thermal insulation mats 32 are flat and substantially perpendicular to the first and second faces 32.1, 32.2. Of course, the invention is not restricted to this geometry.

According to one embodiment visible in FIG. 11, a first thermal insulation mat 32 comprises, at a first edge face 32.3, a rebate 52 positioned in a region of connection connecting the first edge face 32.3 and the first face 32.1, and at a second edge face 32.3', opposite to the first edge face 32.3, comprises an extension 53 in the continuation of the first face 32.1 and which is configured to lodge in the rebate 52' of a second thermal insulation mat 32'.

According to an embodiment visible in FIG. 12, the edge faces 32.3 may be inclined.

The embodiments visible in FIGS. 11 and 12 make it possible to obtain better overlapping in a radial direction (substantially perpendicular to the interior and exterior barriers 24, 26). Other shapes and geometries for the edges faces 32.3 are conceivable.

According to an embodiment illustrated in FIGS. 2 and 3, the intermediary volume 28 between the interior and exterior barriers 24, 26 comprises two insulating layers 30, 30' of juxtaposed thermal insulation mats 32. Of course, the invention is not restricted to this number of layers. Thus, it is possible to provide a higher number of layers of juxtaposed thermal insulation mats 32, depending on the desired thermal insulation performance.

For each insulating layer 30, 30', the thermal insulation mats 32 are juxtaposed so that their edge faces are positioned against one another or with a small spacing between them and so that only small gaps 38 between the thermal insulation mats 32 remain.

According to one particular feature of the invention, the intermediary volume 28 interposed between the interior and exterior barriers 24, 26 is filled with second microspheres 40 outside of the thermal insulation mats 32. In addition to this, the intermediary volume 28 has an enhanced level of vacuum.

According to one configuration, the second microspheres 40 are distributed around the thermal insulation mats 32 in such a way as to envelop them.

According to one embodiment, the second microspheres 40 contained in the intermediary volume 28 on the outside of the wrappers 34 of the thermal insulation mats 32 are identical to those contained inside the wrappers 34.

The thermal insulation mats 32 occupy at least 25% of the intermediary volume 28, the second microspheres 40 making up the rest of the intermediary volume 28.

According to one embodiment, the majority of the intermediary volume 28 is occupied by the thermal insulation mats 32, the second microspheres 40 making up the remainder of the intermediary volume 28. What is meant by the majority of the intermediary volume 28 is that at least 70% of the intermediary volume 28 are occupied by the thermal insulation mats 32, the second microspheres 40 occupying the remainder of the intermediary volume 28.

Thus, the thermal insulation mats 32 provide most of the insulating properties of the wall 22.

According to the invention, in the event of a leak in the exterior barrier 26, the loss of vacuum in the intermediary volume 28 has practically no adverse effect on the insulating properties of the wall 22 insofar as the thermal insulation mats 32 are not affected and fully perform their role as thermal insulation. Even in the event of a loss of vacuum, the second microspheres 40 present in the intermediary volume 28 and on the outside of the thermal insulation mats 32 have insulating properties at ambient pressure that are superior to those of a multilayer insulation of the prior art.

In addition, even if the wrapper 34 of a thermal insulation mat 32 is no longer fluid tight, the insulating properties of this thermal insulation mat 32 are unaffected because it is positioned inside the intermediary volume 28 which is subjected to a vacuum.

From one layer to the other, the thermal insulation mats 32 are arranged in such a way that the gaps 38 of a first insulating layer 30 are offset with respect to the gaps 38 of a second insulating layer 30'. Providing several insulating layers 30 makes it possible to reduce the thickness of the thermal insulation mats 32 of each layer. Offsetting the thermal insulation mats 32 from one layer to another makes it possible to obtain effective insulation even in the event of a loss of vacuum in the intermediary volume 28.

The thicknesses of the thermal insulation mats 32 and the number of layers are determined according to the thermal characteristics desired for the wall 22.

Of the interior and exterior barriers 24, 26 at least a first barrier is rigid and configured so as not to deform when a significant pressure gradient (in excess of 10 bar) arises between its first and second faces F24/F24', F26/F26'.

According to a configuration visible in FIG. 2, the interior barrier 24 is rigid and the exterior barrier 26 is made of a flexible material.

According to a second configuration visible in FIG. 3, the exterior barrier 26 is rigid and the interior barrier 24 is made of a flexible material. According to this configuration, all the thermal insulation mats 32 are in compression. The microspheres and the internal pressure hold the flexible interior barrier 24 in place.

According to another configuration, the interior and exterior barriers 24, 26 are rigid.

The interior and/or exterior barriers 24, 26 may be made of metal, of composite material, or of any other material.

There are numerous conceivable ways of embodying the interior and exterior barriers 24, 26. By way of example, the interior or exterior barrier 24, 26 may be made of INVAR, of polyethylene (PE), of polyethylene terephthalate (PET), of polyamide (PA) or other material.

The interior barrier 24 is produced in a material that is compatible with hydrogen when the tank 20 is configured for storing hydrogen.

The fact that of the interior and exterior barriers 24, 26 at least one is made of a flexible material makes it easier to pull the vacuum in the intermediary volume 28. In spite of compressing as a result of the evacuation, the second microspheres 40 do not significantly lose their insulating properties, unlike the multilayer insulations of the prior art.

The tank 20 comprises at least one rigid connecting system 42 connected to the rigid interior or exterior barrier 24, 26. Providing a rigid exterior barrier 26 to which each connecting system 42 is connected avoids this system having to pass through the wall 22 and avoids heat from being transmitted toward the product stored in the tank 20.

Figure 7A:
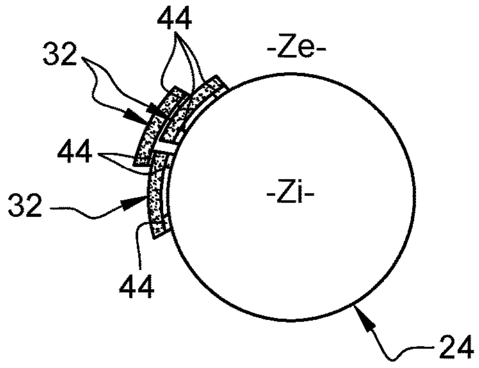
FIGS. 7A-7F are a schematic depiction of the various steps of a method for manufacturing a tank, illustrating one embodiment of the invention.
Figure 7B:
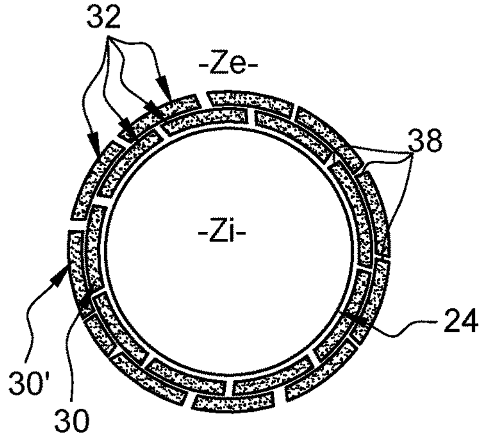
Figure 7C:
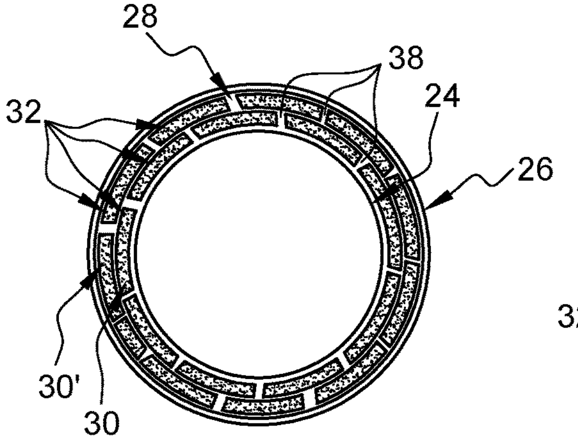
Figure 7D:
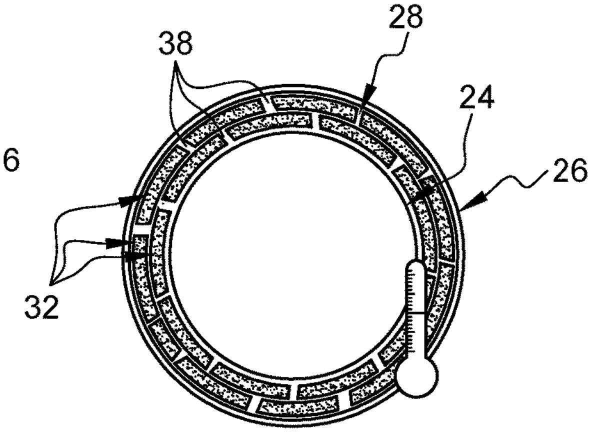
Figure 7E:
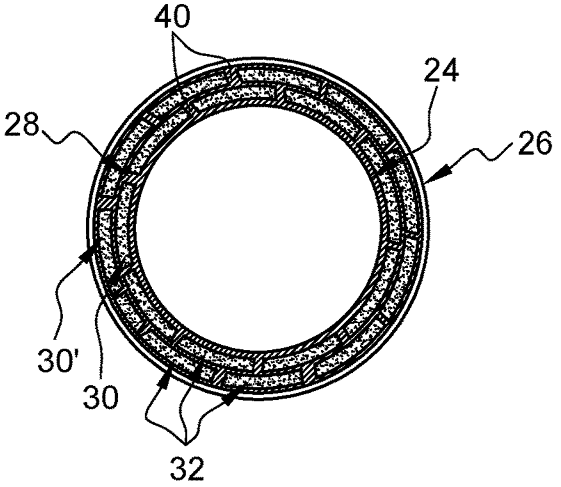
Figure 7F:
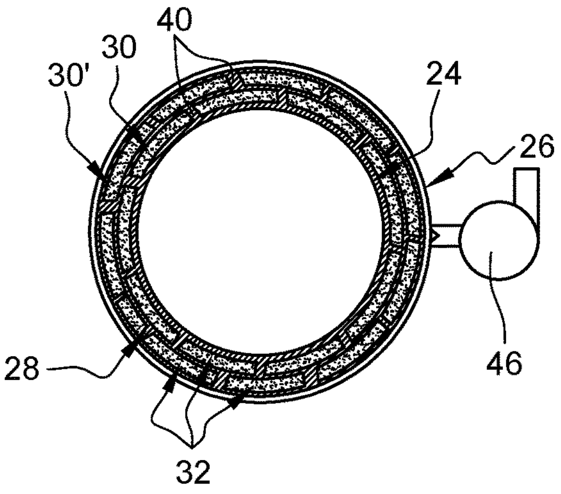

According to one operational embodiment illustrated in FIGS. 7A-7F, the method for manufacturing the tank comprises a step of positioning thermal insulation mats 32 on the rigid interior barrier 24, as illustrated in FIG. 7A, the thermal insulation mats 32 being connected to the interior barrier 24 and possibly to one another by connecting elements 44, such as hook-and-loop tapes, for example. The thermal insulation mats 32 are juxtaposed and superposed in such a way as to form the various insulating layers 30, as illustrated in FIG. 7B. The method then comprises a step of placing the exterior barrier 26 on the last insulating layer 30', as illustrated FIG. 7C, a step of removing moisture from the intermediary volume 28, as illustrated in FIG. 7D, by heating or by injecting an inert gas, a step of filling the intermediary volume 28 with second microspheres 40, as illustrated in FIG. 7E, and finally, in FIG. 7F, a step of pulling a vacuum in the intermediary volume 28, using a pump 46, for example, so as to obtain the desired level of vacuum.

If the interior barrier 24 is flexible and the exterior barrier 26 is rigid, the method comprises a step of positioning the thermal insulation mats 32 against the exterior barrier 26, connecting them to the latter, so as to form at least one insulation layer 30, a step of fitting the interior barrier 24 in such a way as to delimit an intermediary volume in which the thermal insulation mats 32 are positioned, a step of dehumidifying the intermediary volume 28, a step of filling the intermediary volume with microspheres 40, and then a step of pulling the vacuum in the intermediary volume 28.

Whatever the embodiment, the thermal insulation mats 32 are positioned against the rigid interior or exterior barrier 24, 26, and then the other, interior or exterior, barrier 24, 26 is fitted so as to delimit an intermediary volume 28 in which the thermal insulation mats 32 are positioned.

Because of the reduced volume still to be filled with the second microspheres 40, the filling step is simplified and requires only a small volume of second microspheres 40. Because of this reduced volume, the steps of dehumidifying and of pulling the vacuum are also simplified.

According to an embodiment visible in FIG. 9, the wall 22 of the tank comprises a fluid tight intermediate barrier 48 positioned between the interior and exterior barriers 24, 26, spaced away from the latter barriers, and dividing the intermediary volume 28 between the interior and exterior barriers 24, 26 into a first zone Z1 situated between the intermediary barrier 48 and the interior barrier 24, and a second zone Z2 situated between the intermediary barrier 48 and the exterior barrier 26. According to one configuration, the intermediate barrier 48 comprises the thermal insulation mats 32 of the one same layer 30, connected to one another in a fluid tight manner to form the fluid tight intermediate barrier 48.

According to one operating procedure, in order to connect them, the thermal insulation mats 32 are fusion bonded. Of course, the invention is not restricted to this technique for connecting the thermal insulation mats 32 to one another.

According to one configuration illustrated in FIG. 8, at least a first thermal insulation mat 32 comprises at least one extension 50, for example in the form of a flap, comprising a zone of overlap 50.1 overlapping a second thermal insulation mat 32', said zone of overlap 50.1 being connected in a fluid tight manner to this second mat.

According to one arrangement, the extension 50 is situated in the continuation of the second face 32.2 of the thermal insulation mat 32. Of course, the invention is not restricted to this arrangement for the extension 50, which could be positioned in the continuation of the first face 32.1 of the thermal insulation mat 32.

Of course, the invention is not restricted to this embodiment for the intermediate barrier 48. Thus, the latter could be distinct from the thermal insulation mats 32. Due to the intermediate barrier 48, if there is a leak in the interior or exterior barrier 24, 26, only the first or the second zone Z1, Z2 adjacent to this interior or exterior barrier 24, 26 becomes repressurized. The other zone maintains an enhanced level of vacuum.

According to one embodiment, the wall 22 comprises at least one fixed or removable duct 54 opening into the first zone Z1, passing through the second zone Z2 and the exterior barrier 26 to cause the first zone Z1 to communicate with the exterior zone Ze. This duct 54 may be used for pulling the vacuum in the first zone Z1 and filling same with microspheres 40.

As a variant or in addition, the intermediate barrier 48 comprises at least one orifice 56 configured to cause the first and second zones Z1, Z2 to communicate. This orifice 56 may be used for pulling the vacuum in the first zone Z1 and filling it with microspheres 40. According to one configuration, each orifice 56 is equipped with a nonreturn valve 58 configured to allow extraction of the gases present in the first zone Z1 while at the same time preventing any flow of gas from the second zone Z2 toward the first zone Z1, particularly in the event of accidental repressurization of the second zone Z2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tank comprising:

a wall separating an interior zone and an exterior zone, the wall comprising a fluid tight interior barrier, a fluid tight exterior barrier, an intermediary volume interposed between the interior and exterior barriers, and at least one insulating layer positioned in the intermediary volume and comprising at least one thermal insulation mat, said thermal insulation mat comprising a wrapper containing at least a material and having an enhanced level of vacuum, wherein the wrapper of each thermal insulation mat contains first microspheres, wherein the intermediary volume contains second microspheres outside of the thermal insulation mat and has an enhanced level of vacuum.

2. The tank as claimed in claim 1, wherein the second microspheres are distributed around the thermal insulation mat in such a way as to envelop the thermal insulation mat.

3. The tank as claimed in claim 1, wherein the wall comprises at least first and second insulating layers each having several thermal insulation mats which are juxtaposed and separated by gaps, the gaps of the first insulating layer being offset with respect to the gaps of the second insulating layer.

4. The tank as claimed in claim 1, wherein of the interior and exterior barriers, at least one is rigid.

5. The tank as claimed in claim 4, wherein the interior barrier is rigid and the exterior barrier is made of a flexible material.

6. The tank as claimed in claim 4, wherein the exterior barrier is rigid and the interior barrier is made of a flexible material.

7. The tank as claimed in claim 6, wherein the tank comprises at least one rigid connecting system connected to the rigid exterior barrier.

8. The tank as claimed in claim 1, wherein the wall comprises a fluid tight intermediate barrier positioned between the interior and exterior barriers and dividing the intermediary volume into a first zone situated between the intermediate barrier and the interior barrier and a second zone situated between the intermediate barrier and the exterior barrier.

9. The tank as claimed in claim 8, wherein the intermediate barrier comprises the thermal insulation mat of the one same insulating layer which are joined together in a fluid tight manner.

10. The tank as claimed in claim 9, wherein at least a first thermal insulation mat comprises at least an extension having a zone of overlap covering a second thermal insulation mat and connected to the latter in a fluid tight manner.

11. The tank as claimed in claim 8, wherein the wall comprises at least one duct opening into the first zone, said duct passing through the second zone and the exterior barrier.

12. The tank as claimed in claim 8, wherein the intermediate barrier comprises at least one orifice configured to provide communication between the first and second zones, said orifice being equipped with a nonreturn valve configured to allow extraction of gases present in the first zone while preventing any flow of gas from the second zone toward the first zone.

13. A method for manufacturing a tank as claimed in claim 1, wherein the method comprises:

positioning thermal insulation mats against a rigid interior or exterior barrier to form at least one insulating layer, fitting another interior or exterior barrier to delimit an intermediary volume in which the thermal insulation mat is positioned, filling the intermediary volume with microspheres, and pulling a vacuum in the intermediary volume.

14. The method of manufacture as claimed in claim 13, wherein during the positioning step, the thermal insulation mat is connected to the rigid interior or exterior barrier.

* * * * *